April 21, 1959  C. G. MUENCH  2,883,116
MOBILE SPRINKLER
Filed March 12, 1956  2 Sheets-Sheet 1
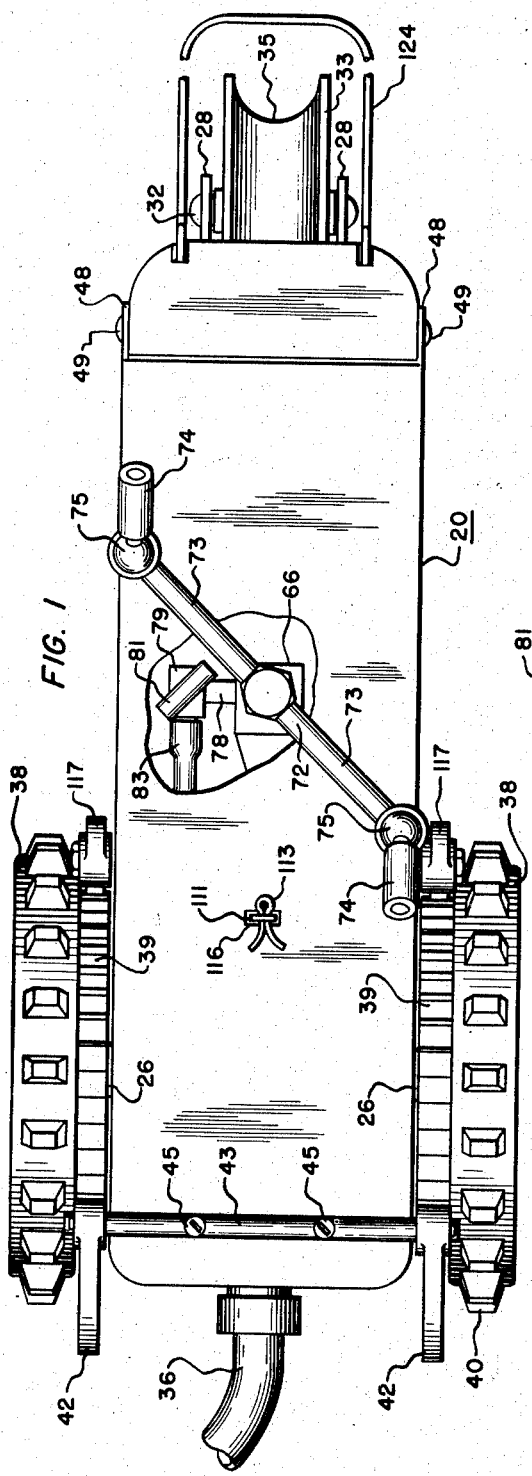
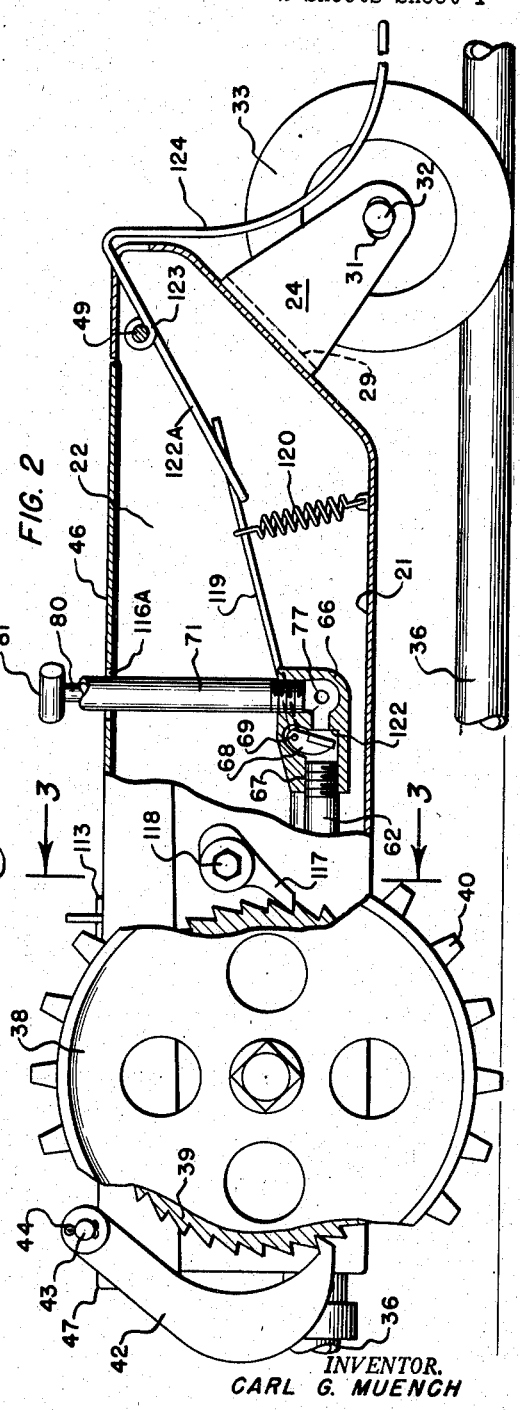
INVENTOR.
CARL G. MUENCH
BY Fulwider, Mattingly
and Huntley
ATTORNEYS

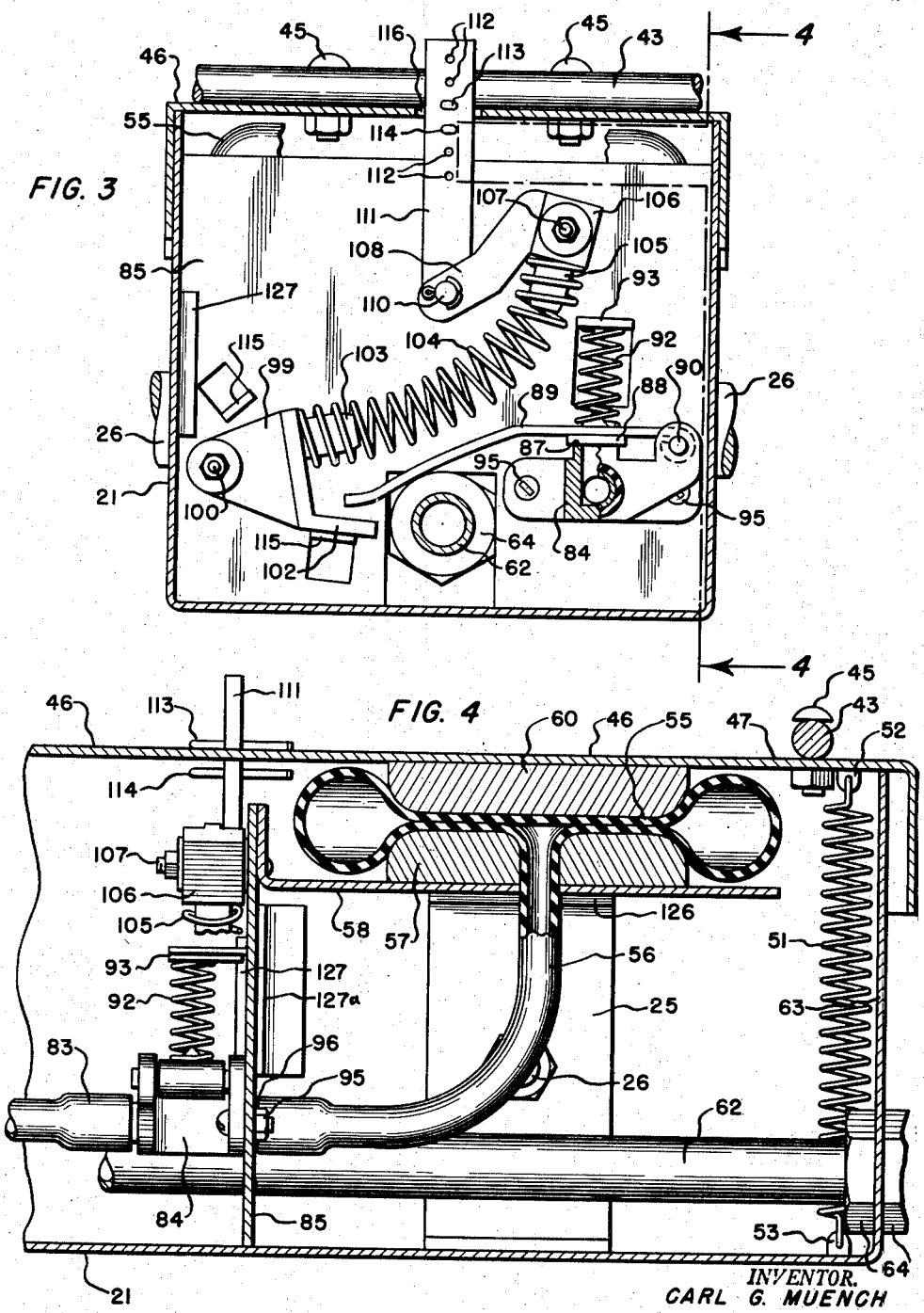

United States Patent Office 2,883,116
Patented Apr. 21, 1959

2,883,116

MOBILE SPRINKLER

Carl G. Muench, Rancho Santa Fe, Calif.

Application March 12, 1956, Serial No. 570,802

10 Claims. (Cl. 239—191)

The present invention relates to a mobile lawn or garden sprinkler and particularly to the type of mobile sprinkler which, while moving, drags the garden hose with it.

Obviously, if the hose, which supplies water to the sprinkler, is dragged along with the sprinkler as the latter moves across the lawn or in the garden, considerable traction must be maintained between the driving wheel or wheels and the soil over which the sprinkler moves. In accordance with the present invention, I utilize a hydraulic motor for moving the sprinkler over the ground, the hydraulic motor being supplied by water from the same hose that supplies water to the sprinkler.

Hydraulic motors of this type utilize an expansible and contractable chamber and valve mechanism for intermittently admitting water, under pressure, to the chamber and then releasing this water pressure to permit collapsing of the chamber. In practicing the present invention, the frame of the sprinkler includes a tank, and this tank receives and is maintained filled with water which is ejected from the expansible-contractable chamber of the hydraulic motor. Thus the weight of this water together with other parts of the sprinkler provide sufficient downward force on the frame wheels to provide the necessary traction between the wheels and the ground over which the sprinkler moves to drag the hose with the sprinkler.

The hydraulic motor of the present invention includes a closed chamber having a wall which is intermittently moved by intermittently admitting water under pressure and permitting water to be removed from the chamber. A lever, in the form of a cover for the water tank, is adapted to be moved to and fro by the expansion and contraction of the chamber wall. This lever carries a dog which is adapted to progressively move a ratchet wheel attached to one of the wheels of the sprinkler to thereby move the sprinkler forwardly.

Further objects and advantages will be apparent from the following description, reference being had to the accompanying drawings wherein a preferred embodiment of the invention is illustrated.

In the drawings:

Fig. 1 is a top plan view of my improved sprinkler;

Fig. 2 is a side view of the sprinkler, parts thereof being broken away to show other parts more clearly;

Fig. 3 is a fragmentary sectional view taken on line 3—3 of Fig. 2 but on a larger scale, parts thereof being broken away to show other parts more clearly; and Fig. 4 is a fragmentary sectional view of the water tank taken on line 4—4 of Fig. 3.

Referring in detail to the drawings, the sprinkler 20 includes a supporting frame 21 including a water tank 22, a front fork 24, and a pair of L-shaped brackets, one of which is shown at 25, each of the latter carrying an axle 26. The front fork 24 includes two legs 28 and a yoke 29. Yoke 29 is suitably secured to the front end of the tank as by welding or soldering. The lower end of each leg is provided with a horizontally elongated slot 31 for receiving the axle 32 of a front wheel 33. The wheel 33 is provided with a groove 35 in the periphery thereof and straddles a garden hose 36, and is thereby guided by the hose.

Each of the L-shaped brackets 25 has a leg suitably secured, as by welding, to a side wall of the tank and the bottom wall of the tank. The axles are suitably secured to the brackets and extend outwardly from opposite sides of the tank. Each axle carries a wheel 38. A ratchet 39 is carried by each wheel 38; preferably, each wheel and ratchet thereof is cast integrally; cleats 40 are also cast integrally with a wheel and ratchet. The wheels are adapted to span the hose 36 as the sprinkler moves along the ground. Preferably a dog 42 is provided for each ratchet 39. These dogs are pivotally carried by a rod 43 and are held in place by cotter pins 44.

In the instant embodiment the rod 43 is secured by bolts 45 to the rear end of a lever 46. Obviously, when the rear end of the lever 46 is lifted, the rod 43 and the two dogs will also be lifted, and, since the dogs 42 are held in tooth-engaging position with the ratchet by gravity, such upward movement will cause rotation of the ratchets 39 and consequently the wheels 38. This will impart forward movement to the sprinkler. In the instant embodiment the lever 46 is in the form of a cover for the tank, the forward end of which is provided with arms 48 which span the forward end of the tank 22 and are pivoted upon a rod 49. When the cover is moved downwardly, the dog will slide over the teeth of the ratchet 39 and fall into purchasing relationship with the teeth, so that on the next succeeding upward movement of the rear end of the cover, the wheels will be rotated to move the sprinkler forwardly.

The upward movement to the rear end of the cover 47 is imparted through a motor, to be hereinafter described. The downward movement of the rear end of the cover is by reason of the weight thereof which is augmented by a spring 51 which is secured to the under side of the cover at 52 and to the bottom of the tank as at 53. The motor includes an expansible chamber comprising preferably a circularly shaped diaphragm 55 formed of rubber or synthetic rubber. This diaphragm is fed from a hose 56. The lower side of the diaphragm rests upon a circularly shaped block 57, which in turn is carried by a plate 58. A block 60, similar to block 57, is suitably secured to the under side of cover 46 and rests upon the top of diaphragm 55. It will be seen that when diaphragm 55 is inflated, the rear end of cover 46 will be raised upwardly, and when water is permitted to drain from the interior of the diaphragm, the cover resting thereon, together with the spring 51, will force the water out of the diaphragm.

A pipe 62 is suitably secured to the extreme rear wall 63 of the tank by nuts 64. This pipe 62 is connected with the hose 36, the hose passing underneath the tank. The pipe 62 extends forwardly and the forward end thereof is threadedly connected with a coupling 66 by thread 67. The coupling includes a shut-off valve 68 pivoted at 69. A standpipe 71 extends upwardly from the coupling 66 which carries the usual type of rotating sprinkler head 72 having branch arms 73 and nozzles 74 connected in the usual manner through ball and socket joint 75. Water from the hose 36 passing through the pipe 62, coupling 66 and standpipe 71 causes the sprinkler head to rotate due to the jet reaction at the nozzles 74.

Coupling 66 is provided with a laterally extending outlet 77 which is connected by a pipe 78 through a needle valve 79, the valve stem 80 thereof being rotatable by a handle 81.

After passing the needle valve 79, the water flows through a flexible tube 83 to a valve 84. This valve body 84 is carried by an upright plate 85. This upright plate 85 is connected to the side walls of the tank and also provides a support for the plate 58. The valve body 84 is provided with a seat 87 which is arranged to be closed by a valve 88. This valve is carried by a lever 89 which is pivoted on pin 90 carried by the valve body 84. Valve 88 is normally urged onto its seat 87 by a compression spring 92. This compression spring is interposed between the top side of the lever 89 and an abutment 93 carried on plate 85.

The valve body 84 is attached to the plate 85 by bolts 95. Valve body 84 has a nipple 96 extending therefrom and through the plate 85, and the tube 56 is connected with this nipple. Thus water is free to flow from the hose 36 to the tank 22 when the valve 88 is away from its seat 87. However, when the valve 88 is closed upon its seat 87, the water cannot escape by the valve and therefore the diaphragm 55 will become inflated. After the diaphragm is inflated, and when the valve 88 is moved away from its seat 87, water can flow from the tube 83 into the tank and flow from tube 56 into the tank.

Snap-acting mechanism is utilized for moving the valve 88 from its open to its closed position, and from its closed to its open position. This snap-acting mechanism includes a bell crank lever 99 which is pivoted at 100 to the upright plate 85. One arm 102 of the bell crank lever is arranged to engage the lever 89 carrying the valve 88. The other lever 103 of the bell crank lever is in the form of a post for guiding one end of a spring 104. The other end of spring 104 is guided by a post 105, which is one of the two arms of a bell crank lever 106. This bell crank lever is pivoted at 107 to the upright plate 85. The other arm 108 of the bell crank lever 106 is attached by a pin 110 to a link 111. Link 111 extends vertically and is provided with a series of holes 112 for receiving two cotter pins 113 and 114.

Link 111 extends through an opening 116 in the cover 46 of the tank. One cotter pin 113 is arranged to engage the upper side of the cover 46 and pin 114 is arranged to engage the under side of the cover 46. Upon upward movement of the cover 46, it will engage the pin 113 and pull the link 111 upwardly, rotating the bell crank lever 106 in a clockwise direction, carrying with it the upper part of spring 104. After the spring 104 is moved beyond a dead center position, by post 105, with respect to pivot points 107 and 100, the spring 104 will exert a snap action to bell crank lever 99 in a counterclockwise movement to said bell crank lever 99, resulting in lever arm 102 of said bell crank lever 99 lifting lever 89 and thereby removing the valve 88 from its seat 87, whereby, as previously stated, water can drain from the diaphragm 55, permitting deflation of the latter. The extent of movement of bell crank lever 99 is controlled by stops 115 which are in the form of ears punched from the sheet metal upright plate 85.

The weight of the cover 46, augmented by the spring 51, will force water out of the diaphragm 55 and, of course, permit the rear end of the cover 46 to fall. Upon lowering of the rear end of the cover 46, it will engage pin 114 on link 111 and consequently move bell crank lever 106 in a counterclockwise direction. After the post 105 of bell crank lever 106 moves the upper part of the spring 104 beyond the dead center position with respect to pivot points 107 and 100, the bell crank lever 99 will be shifted to the position shown in Fig. 3, in which position lever arm 102 is disengaged from lever 89 and spring 92 will then force valve 88 upon its seat 87. Now then, since the water cannot escape through valve outlet 87, the pressure of the water in the hose 36 is impressed in diaphragm 55, causing inflation of the latter. Thus the diaphragm 55 is intermittently inflated and deflated to provide a reciprocating motor for intermittently actuating the dogs 42, to thus propel the mobile sprinkler forwardly.

The forward movement of the mobile unit must, of necessity, require the dragging along of the hose 36. Since this hose must be dragged, considerable traction must be maintained between the cleats 40 of the wheel and the ground over which the sprinkler moves. The water in the tank together with the weight per se of the sprinkler assures sufficient weight to give the traction necessary between the cleats and the ground. The tank is maintained filled with water by the intermittent supply of water thereto through the intermittent opening of the valve 87, the water escaping through the top of the tank through the opening 116A, through which the standpipe 71 extends, and over the top of the tank. A dog 117 pivoted at 118 is provided for each of the ratchets 39 to prevent accidental rearward movement of the mobile sprinkler while the cover 46 is moving downwardly. Thus, if the tractor is moving forwardly up a hill, it cannot roll back while the dogs 42 are moving downwardly. It will be understood that these dogs 117 are weighted in such a manner as to be normally urged towards the teeth of the ratchet wheel 39.

The shut-off valve 68, which controls the flow of water to the sprinkler head and to the motor, can be turned in a counterclockwise direction by a lever 119 connected to the pivot 69 of the valve. Normally valve 68 is maintained open through a tension spring 120 connected to the lever 119. Thus water is always free to flow to the sprinkler head and to the motor valve body 84. However, when lever 119 is lifted, i.e., moved in a counterclockwise direction, to a predetermined extent, the pressure on the water will cause valve 68 to close upon its seat 122 and therefore prevent the flow of water to the sprinkler head and the valve body 84. Lever 119 is adapted to be moved in a counterclockwise direction by a lever arm 122A of a lever 123 which is pivoted on the pin 49. Lever 123 is pivoted on pin 49 and includes a forwardly extending lever arm 124. Should this lever arm 124 strike an object, it will be rotated in a counterclockwise direction, imparting closing movement to the valve 68 through the lever 119. Thus the forward movement of the mobile tractor can be determined by placing an obstruction in the path of the lever arm 124.

The speed of the forward movement of the sprinkler can be regulated by regulating the speed of inflation of diaphragm 55. This is accomplished through the adjustment of the needle of the needle valve 79. Since water, contained in the tank, is utilized to provide the necessary auxiliary weight for traction purposes, the entire sprinkler can be made relatively light, and therefore can be readily lifted and moved about by women and children. It is necessary only to lift the forward end of the sprinkler and drain the water from the tank; then the relatively light weight machine can be carried to where it is desired.

The plate 58 is arranged to rest upon horizontally extending ridges 126 suitably secured to the side walls of the tank. The plate 85 is guided by two pairs of guideways 127 and 127a, each pair being secured to a side wall of the tank. The plates 58 and 85 are suitably secured to one another as by welding or soldering. Plates 58 and 85, together with the block 57 and diaphragm 55 including hose 56, and plate 85 including the mechanism carried thereby, namely the snap-acting mechanism and the valve body 84, all constitutes a sub-assembly. By removing cotter pin 113 and disconnecting the hose 83 either from the valve body 84 or from the needle valve body 79, the entire sub-assembly can be removed as such from the interior of the tank, of course after the cover 46 has been removed.

The purpose of the elongated bearing opening 31 for the axle 32 of the front wheel 33 is to permit forward movement of one end of the axle relative to the other end, whereby the axle of the wheel 33 can be shifted so as to negotiate a curve. Thus the hose 36 can be used for defining the path which the sprinkler is to follow, and this is accomplished by permitting shifting forwardly of one or the other side of the axle for the wheel 33.

While the form of embodiment herein shown and described constitutes a preferred form, it is to be understood that other forms may be adopted falling within the scope of the claims that follow.

I claim:

1. A mobile sprinkler, comprising in combination, a supporting frame including a tank for water; wheels carrying the frame; a hydraulic motor carried by the frame; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet; and means for actuating said valve intermittently to thereby maintain the tank filled with water at all times during the operation of the sprinkler including mechanism actuated by said hydraulic motor intermittently.

2. A mobile sprinkler, comprising in combination, a supporting frame including a tank for water; wheels carrying the frame; a hydraulic motor carried by the frame; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet; means normally urging the valve toward closed position; and mechanism actuated by said hydraulic motor for intermittently opening said valve to thereby maintain the tank filled with water at all times during the operation of the sprinkler.

3. A mobile sprinkler, comprising in combination, a supporting frame including a tank for water; wheels carrying the frame; a hydraulic motor carried by the frame; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet; means normally urging the valve toward closed position; and snap-acting mechanism actuated by said hydraulic motor for intermittently opening said valve to thereby maintain the tank filled with water at all times during the operation of the sprinkler.

4. A mobile sprinkler, comprising in combination, a supporting frame including a tank for water; wheels carrying the frame; a hydraulic motor carried by the frame; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet, said hydraulic motor including an expansible chamber; means normally urging the valve toward closed position; and mechanism connected with and actuated upon expansion of said chamber for intermittently opening said valve to thereby maintain the tank filled with water at all times during the operation of the sprinkler.

5. A mobile sprinkler, comprising in combination, a supporting frame including a tank for water; wheels carrying the frame; a hydraulic motor carried by the frame; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet, said tank including a movable cover therefor; means including said cover normally urging the valve toward closed position; and mechanism actuated by said hydraulic motor for intermittently opening said valve.

6. A mobile sprinkler, comprising in combination, a supporting frame including a tank for water; wheels carrying the frame; a hydraulic motor carried by the frame; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet, said tank including a movable cover therefor, said hydraulic motor including an expansible chamber; means including said cover normally urging the valve toward closed position; and mechanism connected with and actuated upon expansion of said chamber for intermittently opening said valve.

7. A mobile sprinkler, comprising in combination, a supporting frame including a tank for water; wheels carrying the frame; a hydraulic motor carried by the frame; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet, said hydraulic motor including an expansible chamber; means normally urging the valve toward closed position; and snap-acting mechanism connected with and actuated upon expansion of said chamber for intermittently opening said valve to thereby maintain the tank filled with water at all times during the operation of the sprinkler.

8. A mobile sprinkler, comprising in combination, a supporting frame including a tank for water; wheels carrying the frame; a hydraulic motor carried by the frame said motor including an expansible chamber; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet, said tank including a movable cover therefor; means including said cover for normally urging the valve toward closed position; and snap-acting mechanism connected with and actuated upon expansion of said chamber for intermittently opening said valve.

9. A mobile sprinkler, comprising in combination, a supporting frame including a tank for water; wheels carrying the frame; a hydraulic motor carried by the frame; driving mechanism between the hydraulic motor and one of the wheels; a sprinkler head carried by the frame; a branched water supply conduit carried by the frame including a branch connected with the sprinkler head and another branch connected with the hydraulic motor, said latter branch having an outlet for feeding water to the tank; a valve for controlling the flow of water through said outlet, said tank including a cover; means pivotally supporting said cover on an axis parallel with the axis of the wheels; a spring normally urging said cover downwardly, said hydraulic motor including an expansible chamber adapted to move the cover upwardly; means normally urging the valve toward closed position; and snap-acting mechanism actuated by the upward movement of the cover for opening said valve, said snap-acting mechanism being actuated in the reverse direction by the cover and spring upon contraction of the expansible chamber.

10. A mobile sprinkler, comprising in combination, a supporting frame including a tank for water; a cover for the tank pivotally carried on the frame; wheels carried by the frame for supporting the frame; a ratchet wheel secured to one of the wheels; a hydraulic motor carried by the frame; a sprinkler head carried by the frame; a branched water supply conduit carried by the frame including a branch connected with the sprinkler head and another branch connected with the hydraulic motor, said hydraulic motor including a closed water chamber having a wall movable in response to changes in pressure in the chamber, said wall engaging the cover for moving the latter; a dog carried by the cover and cooperating with the ratchet wheel for rotating the ratchet wheel; and means actuated by movements of the cover for causing water to be admitted to the chamber intermittently under pressure and for alternately intermittently admitting water to the tank to maintain said tank filled with water at all times during the operation of the sprinkler.

References Cited in the file of this patent

UNITED STATES PATENTS

| | | |
|---|---|---|
| 2,057,217 | Soper | Oct. 13, 1936 |
| 2,493,528 | Crowder | Jan. 3, 1950 |
| 2,575,828 | Muench | Nov. 20, 1951 |
| 2,604,359 | Zybach | July 22, 1952 |

FOREIGN PATENTS

| | | |
|---|---|---|
| 102,948 | Australia | Jan. 11, 1938 |